(12) United States Patent
Liu et al.

(10) Patent No.: US 11,171,561 B2
(45) Date of Patent: Nov. 9, 2021

(54) TRANSFORMER AND SERIES RESONANT CONVERTER INCLUDING THE SAME

(71) Applicant: National Taiwan University of Science and Technology, Taipei (TW)

(72) Inventors: Yu-Chen Liu, Taipei (TW); Chen Chen, New Taipei (TW); De-Jia Lu, Taoyuan (TW); Yong-Long Syu, Tainan (TW); Kai-De Chen, Tainan (TW); Ching-Chia Chen, New Taipei (TW); Katherine Ann Kim, Marquette, MI (US); Huang-Jen Chiu, New Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 65 days.

(21) Appl. No.: 16/779,715

(22) Filed: Feb. 3, 2020

(65) Prior Publication Data

US 2020/0395844 A1 Dec. 17, 2020

(30) Foreign Application Priority Data

Jun. 17, 2019 (TW) .................................. 108120919

(51) Int. Cl.
*H02M 3/335* (2006.01)
*H02M 7/23* (2006.01)
(Continued)

(52) U.S. Cl.
CPC .......... *H02M 1/4241* (2013.01); *H01F 27/28* (2013.01); *H02M 1/0048* (2021.05);
(Continued)

(58) Field of Classification Search
CPC ............. H02M 3/335; H02M 3/33569; H02M 3/33571; H02M 3/33576; H02M 3/33592;
(Continued)

(56) References Cited

U.S. PATENT DOCUMENTS

2007/0236321 A1* 10/2007 Iwai ........................ H01F 30/06
336/212
2017/0331371 A1* 11/2017 Parto ...................... H02M 3/156
(Continued)

FOREIGN PATENT DOCUMENTS

| CN | 204334330 U | 5/2015 |
| TW | M569488 U | 11/2018 |
| TW | 201911721 A | 3/2019 |

*Primary Examiner* — Gary L Laxton
(74) *Attorney, Agent, or Firm* — Li & Cai Intellectual Property (USA) Office

(57) ABSTRACT

A transformer includes a magnetic core, a primary side winding and a plurality of secondary side windings. The magnetic core includes a first outer column, a second outer column, an upper cover and a lower cover. The first outer column and the second outer column are disposed between the upper cover and the lower cover. The primary side winding is disposed on the first outer column and the second outer column, and the plurality of secondary side windings are disposed on the first outer column and the second outer column. Each of the secondary windings has one end passing through a region between the first outer column and the second outer column.

13 Claims, 7 Drawing Sheets

(51) Int. Cl.
| | |
|---|---|
| *H02M 1/42* | (2007.01) |
| *H01F 27/28* | (2006.01) |
| *H02M 1/44* | (2007.01) |
| *H02M 3/00* | (2006.01) |
| *H02M 1/00* | (2006.01) |

(52) U.S. Cl.
CPC ........... *H02M 1/0083* (2021.05); *H02M 1/44* (2013.01); *H02M 3/01* (2021.05); *H02M 3/33569* (2013.01); *H02M 7/23* (2013.01); *H02M 1/0058* (2021.05); *H02M 1/0064* (2021.05)

(58) Field of Classification Search
CPC ........ H02M 3/01; H02M 7/23; H02M 1/0048; H02M 1/0083
See application file for complete search history.

(56) References Cited

U.S. PATENT DOCUMENTS

| | | |
|---|---|---|
| 2018/0278174 A1 | 9/2018 | Chen |
| 2019/0043660 A1* | 2/2019 | Jin ........................ H02M 3/285 |

* cited by examiner

TRANSFORMER AND SERIES RESONANT CONVERTER INCLUDING THE SAME

CROSS-REFERENCE TO RELATED PATENT APPLICATION

This application claims the benefit of priority to Taiwan Patent Application No. 108120919, filed on Jun. 17, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a transformer and a series resonant converter including the same, and more particularly to a transformer for reducing loss of an output current on windings by a fractional loop structure and a series resonant converter including the same.

BACKGROUND OF THE DISCLOSURE

LLC-type series resonant converter (LLC SRC) can be provided with characteristics that the primary side can be zero-voltage switched and synchronous rectifier components on the secondary side can be zero-current switched. When the switch operation frequency of the converter is between the first resonant point and the second resonant point, a zero-switching condition for the converter is independent of the load, and thus the characteristics that the zero-voltage switching (ZVS) for switches on the primary side and the zero-current switching (ZCS) for rectifier components on the secondary side can be achieved in a full range from lightly loaded to fully loaded.

For the architecture of a high wattage and low voltage output LLC series resonant converter, the copper loss of the output winding and the core loss of the magnetic component are one of the main sources of loss, and the overall volume is determined by the size of the magnetic component.

Therefore, how the above defects can be overcome to improve the copper loss of the output winding and the loss of the magnetic component through the improvement of the circuit and structure design has become an important issue in the art.

SUMMARY OF THE DISCLOSURE

In response to the above-referenced technical inadequacies, the present disclosure provides a series resonant converter, which reduces the loss of the output current on the winding by a fractional-turn transformer structure.

In one aspect, the present disclosure provides a series resonant converter, which includes a switching circuit, a resonant tank, a transformer and a rectifier circuit. The switching circuit has a power source connected to a primary side upper bridge switch and a primary side lower bridge switch, and the primary side upper bridge switch and the primary side lower bridge switch are configured to control an input from the power source. The resonant tank is coupled to the switching circuit, which includes a resonant inductor, a resonant capacitor and a magnetizing inductor connected in series. The transformer is coupled to the resonant tank, and the transformer includes a magnetic core, a primary side winding, and a plurality of secondary side windings. The magnetic core includes a first outer column, a second outer column, an upper cover and a lower cover. The first outer column and the second outer column are disposed between the upper cover and the lower cover. The primary side winding is disposed on the first outer column and the second outer column, and the plurality of secondary side windings are disposed on the first outer column and the second outer column. The rectifier circuit has a plurality of secondary side output rectifier switches connected to the transformer for receiving and rectifying an output of the transformer, and coupling an output capacitor and a load. The secondary side windings are connected to the secondary side output rectifier switches through a region between the first outer column and the second outer column.

In one aspect, the present disclosure provides a transformer including a magnetic core, a primary side winding and a plurality of secondary side windings. The magnetic core includes a first outer column, a second outer column, an upper cover and a lower cover. The first outer column and the second outer column are disposed between the upper cover and the lower cover. The primary side winding is disposed on the first outer column and the second outer column, and the plurality of secondary side windings are disposed on the first outer column and the second outer column. Each of the secondary windings has one end passing through a region between the first outer column and the second outer column.

Therefore, the transformer and the series resonant converter including the same provided by the present disclosure can effectively combine concepts of flux canceling and fractional-turn transformer, while reducing core loss and copper loss, thereby achieving high efficiency and high power density.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
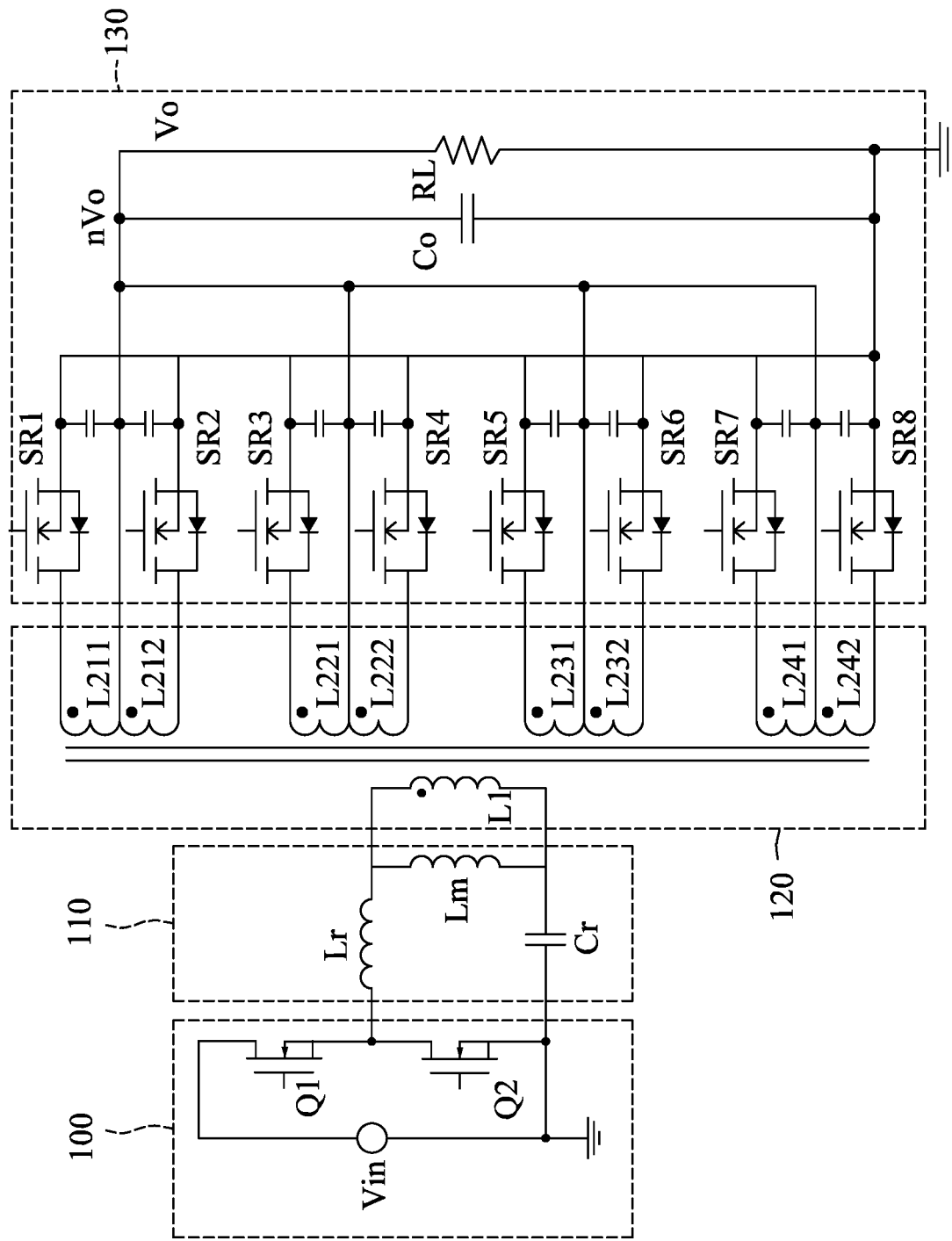
FIG. 1 is a circuit layout of a series resonant converter according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
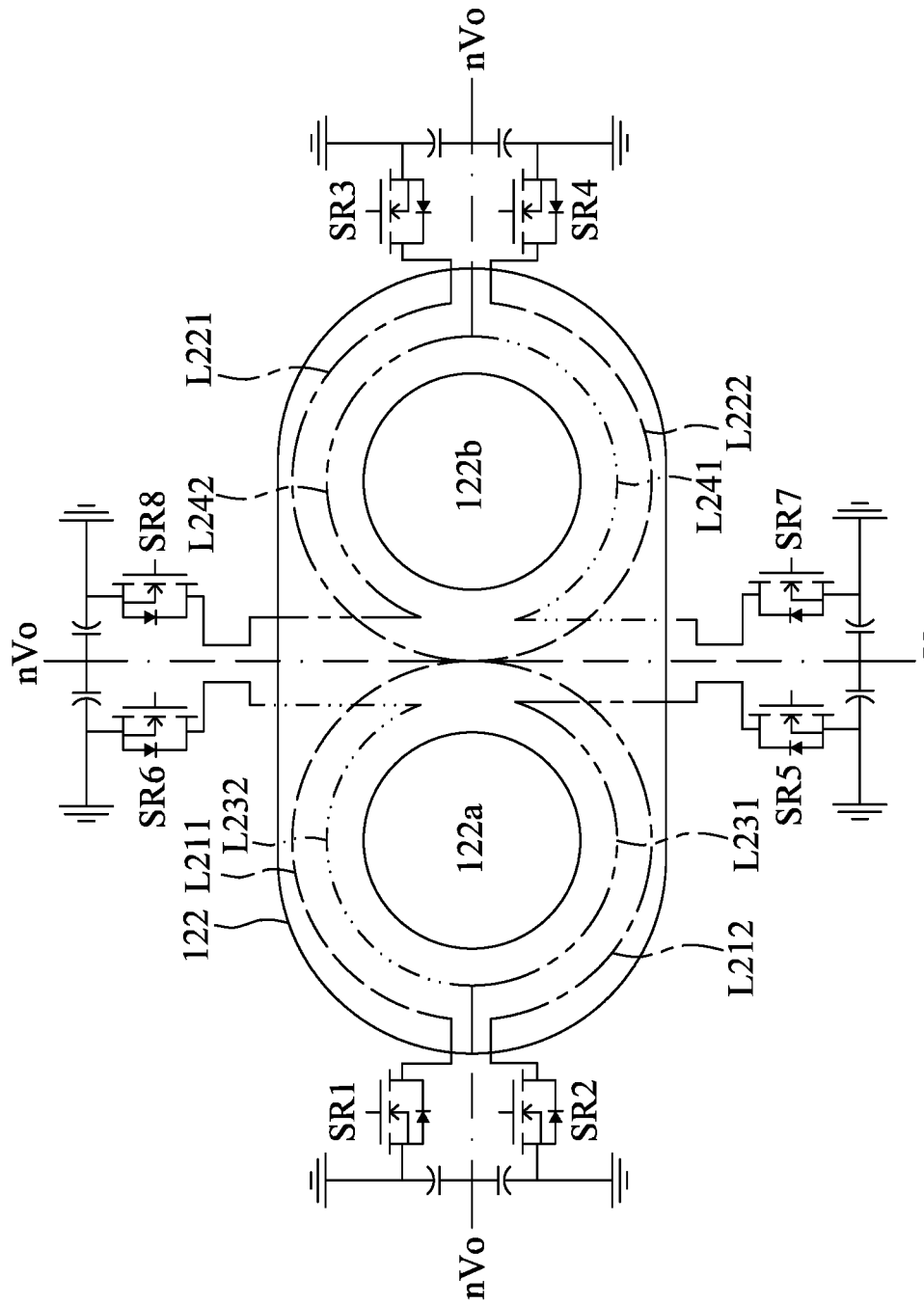
FIG. 2 is a schematic diagram of secondary side windings of the series resonant converter according to an embodiment of the present disclosure.

Reference is made to FIG. 1, which is a circuit layout of a series resonant converter according to an embodiment of the present disclosure. FIG. 2 is a schematic diagram of secondary side windings of the series resonant converter according to an embodiment of the present disclosure. As shown in the figures, an embodiment of the present disclosure provides a series resonant converter 10 including a switching circuit 100, a resonant tank 110, a transformer 120, and a rectifier circuit 130. The switching circuit 100 has a power source Vin connected to a primary side upper bridge switch Q1 and a primary side lower bridge switch Q2, and the primary side upper bridge switch Q1 and the primary side lower bridge switch Q2 are configured to control an input of the power source Vin, such as an input voltage and an input current of the power source Vin.

The resonant tank 110 is coupled to the switching circuit 100, which includes a resonant inductor Lr, a resonant capacitor Cr and a magnetizing inductor Lm connected in series. The transformer 120 is coupled to the resonant tank 110, and the transformer 120 includes a magnetic core 122, a first outer column 122a, a second outer column 122b, a primary side winding L1, and a plurality of secondary side windings L21, L22, L23 and L24.

As shown in FIG. 2, the magnetic core 122 is designed as the magnetic core 122 having the first outer column 122a and the second outer column 122b to be used by the transformer 120, and the material of the magnetic core 122 may select SF36 MnZn power ferrite material produced by Ferroxcube, the material having a good loss performance at high frequencies. The primary side winding L1 can be wound in a magnetic flux canceling manner, that is, half of the number of winding turns being clockwisely wound around the first outer column 122a, and half of the number of winding turns being counterclockwisely wound around the second outer column 122b. Rectification forms of the secondary side windings L211, L221, L231, L241, L212, L222, L232 and L242 can be divided into four sets of center-tapped rectifiers, and the switching circuit 100 includes rectifier switches SR1, SR2, SR3, . . . SR8, as shown in FIG. 1. A structure of the transformer 122 of FIG. 2 is designed in such a way that all of eight windings will pass through a region between the first outer column 122a and the second outer column 122b of the transformer 122, that is, the windings will pass through a region in which the magnetic flux is formed with a closed loop.

The secondary side windings L211, L212, L221 and L222 are the main windings, from which it can be found that the secondary side windings L211 and L222 form a half-eight-shaped winding, and the secondary side windings L212 and L221 form another half-eight-shaped winding. The secondary windings L232, L231, L242, and L241 are auxiliary windings for making up one complete turn for the windings on the magnetic column. In the concept that the main windings are provided with half-eight-shape windings, in order to achieve magnetic flux cancellation, the primary side winding L1 generates magnetic flux, having opposite directions, on the first outer column 122a and the second outer column 122b, which will be further explained when considering operation intervals of the circuit.

In the present embodiment, the resonant tank 110 consists of the resonant inductor Lr, the resonant capacitor Cr, and the magnetizing inductance Lm. By the interleaved switching of the primary side upper bridge switch Q1 and the primary side lower bridge switch Q2, energy is transmitted from the resonant tank 110 and the transformer 120 to the secondary side output, and a dead-time in that the primary side upper bridge switch Q1 and the primary side lower bridge switch Q2 stop switching is utilized to release the energy stored on the parasitic capacitance of the primary side upper bridge switch Q1 and the primary side lower bridge switch Q2 to zero, and a characteristic that the series resonant converter can be zero-voltage switched to ON state can be achieved.

In detail, the half-bridge series resonant circuit operates in a SRC (Series Resonant Converter) resonance mode and an LLC (LLC-Type Series Resonant Converter) resonance mode, respectively. The magnetizing inductor Lm determines whether to participate in resonance according to different switching operation regions. In SRC mode, the magnetizing inductor Lm does not participate in resonance, the first resonant frequency is determined by the resonant inductor Lr1 and the resonant capacitor Cr1, and since the resonant inductor Lr, the resonant capacitor Cr of the resonant circuit, and the load are in series relationship, the maximum voltage gain for the SRC resonant mode is generated when the switching frequency FSW operates with a first resonant frequency FR1, as shown in the following equation (1):

$$fsw = fr1 = \frac{1}{2\pi\sqrt{LrCr}}. \tag{1}$$

In the LLC mode, the magnetizing inductor Lm participates in resonance, which forms a resonant network with the resonant inductor Lr and the resonant capacitor Cr1. The magnetizing inductor Lm merges with the resonant inductor Lr, and then produces a second resonant frequency FR2 with the resonant capacitor Cr, as shown in the following equation (2):

$$fr2 = \frac{1}{2\pi\sqrt{(Lr+Lm)Cr}}. \quad (2)$$

Three intervals can be divided on the frequency response curve by two resonant frequency points, that is, the first resonant frequency fr1 and the second resonant frequency fr2. The biggest difference between the operation in LLC mode and the SRC mode is that the voltage gain of the LLC mode is greater than 1, and in addition, the zero voltage switching condition of an power transistor in this operation mode is only related to the magnetizing inductor Lm, but is independent of the output current, which means that the zero voltage switching condition can be satisfied as long as the current on the magnetizing inductor is large enough. On the other hand, when the converter is switched to a frequency fsw to be operated in the LLC mode, the operating frequency is less than the first resonant frequency fr1 and greater than the second resonant frequency fr2. The resonant current is decreased to be equal to a magnetizing current before the switch is cut off. When the resonant current is equal to the magnetizing current, the current does not flow into the primary side of the transformer 120, and there is no energy transfer to the load end, the output rectifier switch reaches zero-current cutoff since there is no current flow thereto, and thus the output voltage cannot clamp the magnetizing inductor Lm with the transformer 120 via the output rectifier switch. In this region, the resonant element including the resonant inductor Lr, the resonant capacitor Cr, and the magnetizing inductor Lm enters a second resonant mode. Preferably, the series resonant converters of the present disclosure operate in the second region.

The rectifier circuit 130 has a plurality of secondary side output rectifier switches SR, configured to receive and rectify an output voltage and an output current of the transformer 120, and the plurality of secondary side output rectifier switches SR are coupled to an output capacitor Co and a load RL.

In more detail, the four secondary side windings L21, L22, L23 and L24 each has a central tap structure, which include positive half cycle windings L211, L221, L231, L241 and negative half cycle windings L212, L222, L232, L242, and the four secondary side output rectifier switches include rectifier switches SR1, SR3, SR5, and SR7 as positive half cycle rectifier switches and rectifier switches SR2, SR4, SR6, and SR8 as negative cycle rectifier switches. Here, the positive half cycle windings L211, L221, L231, L241 are respectively coupled to the positive half cycle rectifier switches SR1, SR3, SR5, and SR7, and the negative half cycle windings L212, L222, L232, L242 are respectively coupled to the negative half cycle rectifier switches SR2, SR4, SR6, and SR8.

Figure 3A:
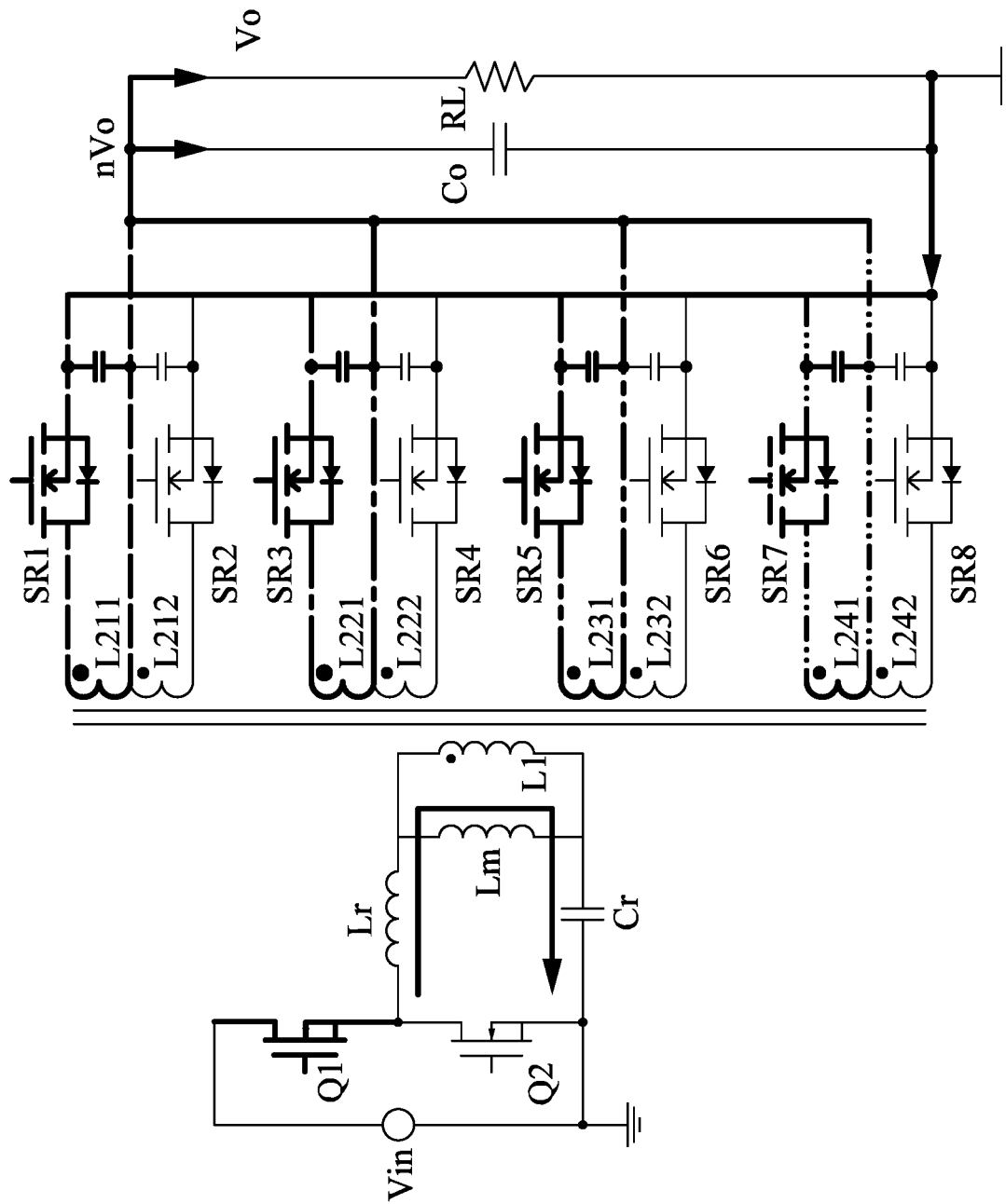
FIG. 3A is a schematic diagram of positive half cycle current paths of the series resonant converter according to an embodiment of the present disclosure.
Figure 3B:
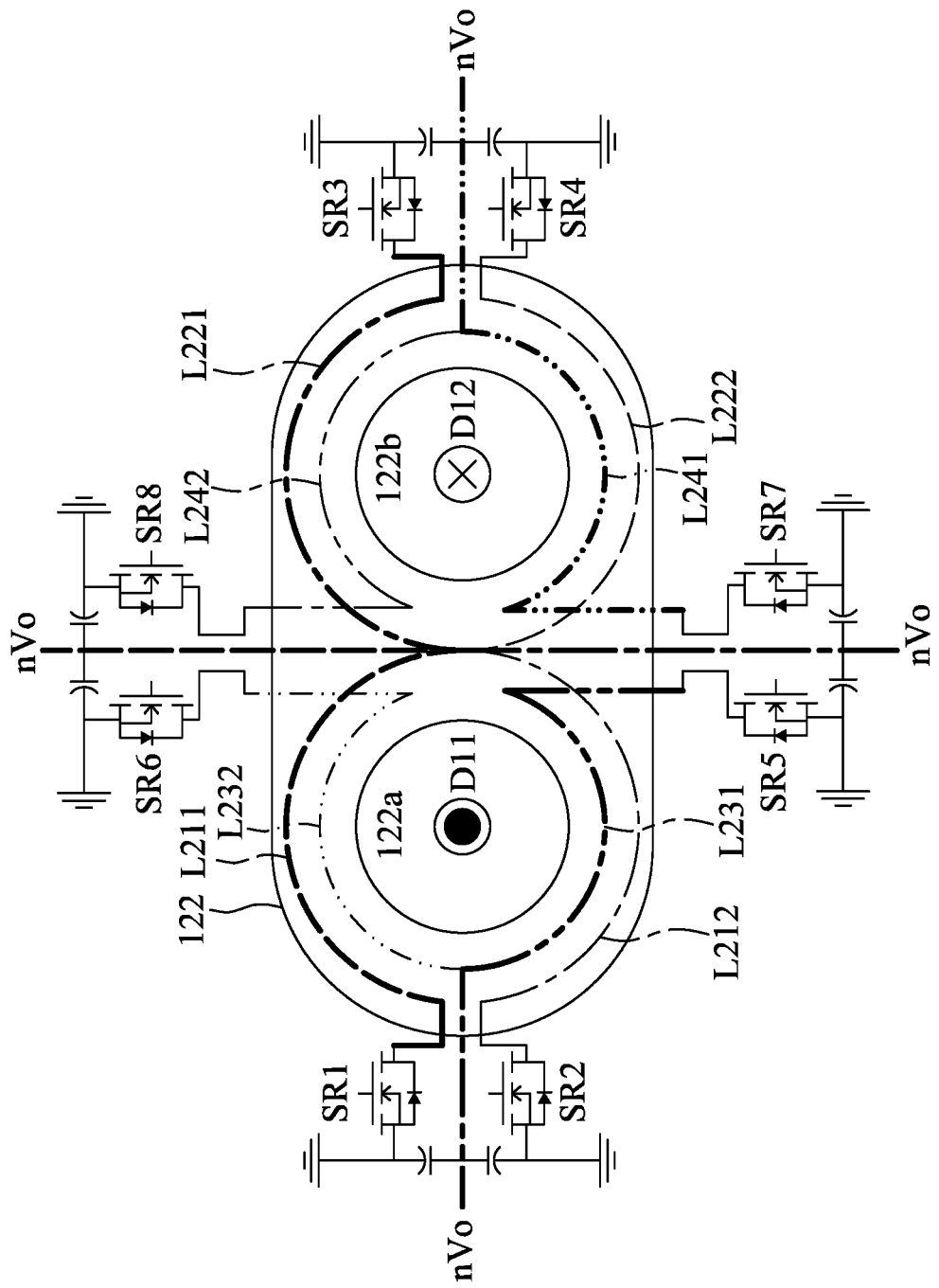
FIG. 3B is a schematic diagram of current paths of a positive half cycle winding of the primary side winding of the series resonant converter according to an embodiment of the present disclosure.

Reference is made to FIGS. 3A and 3B, FIG. 3A is a schematic diagram of positive half cycle current paths of the series resonant converter according to an embodiment of the present disclosure. FIG. 3B is a schematic diagram of current paths of a positive half cycle winding of the primary side winding of the series resonant converter according to an embodiment of the present disclosure.

The primary winding L1 of the transformer 122 has 8 turns, and the secondary windings L211, L221, L231, L241, L212, L222, L232, and L242 are 0.5 turns to meet an input of 380V and an output of 12V. The primary side winding L1 and the secondary side windings L211, L221, L231, L241, L212, L222, L232, and L242 of the transformer 122 are wound around the first outer column 122a and the second outer column 122b of the magnetic core 122.

In the positive half cycle operation mode, the primary side upper bridge switch Q1 is turned on, and the primary side lower bridge switch Q2 is turned off. As shown in FIG. 3A, a current direction of the primary side flows counterclockwise at the first outer column 122a, and flows clockwise at the second outer column 122b causing an induced magnetic field in the magnetic core 122. Magnetic field directions D11 and D21 on the first outer column 122a and the second outer column 122b are as shown in FIG. 3A.

According to Faraday's law, the secondary side of the transformer 120 generates a current in the clockwise direction in the first outer column 122a and a current in the counterclockwise direction in the second outer column 122b to against the applied magnetic field, and a current on the secondary side of the transformer 120 flows from the ground to the rectifier switches SR1, SR3, SR5, SR7, flows through the secondary windings, and finally flows to the output node nVo. Here, any of the output nodes nVo is connected to the same node with the remaining three output nodes nVo, as shown in FIG. 3A. Therefore, the secondary side windings L211, L221, L231, L241, L212, L222, L232, and L242 can be regarded as being connected in parallel relationship and the number of equivalent turns on the secondary side is 0.25 turns.

Here, since the four secondary side windings L21, L22, L23 and L24 are wound on the center column 124 and the number of equivalent winding turns summed by the four secondary side windings L21, L22, L23 and L24 satisfies a condition of 1 turn, the generated magnetic field is the same as that of the existing condition in which a winding is wound on the center column for 1 turn, and thus there will be no incomplete corner in the inner magnetic field in the transformer 122, thereby avoiding an unbalanced effect.

Figure 4A:
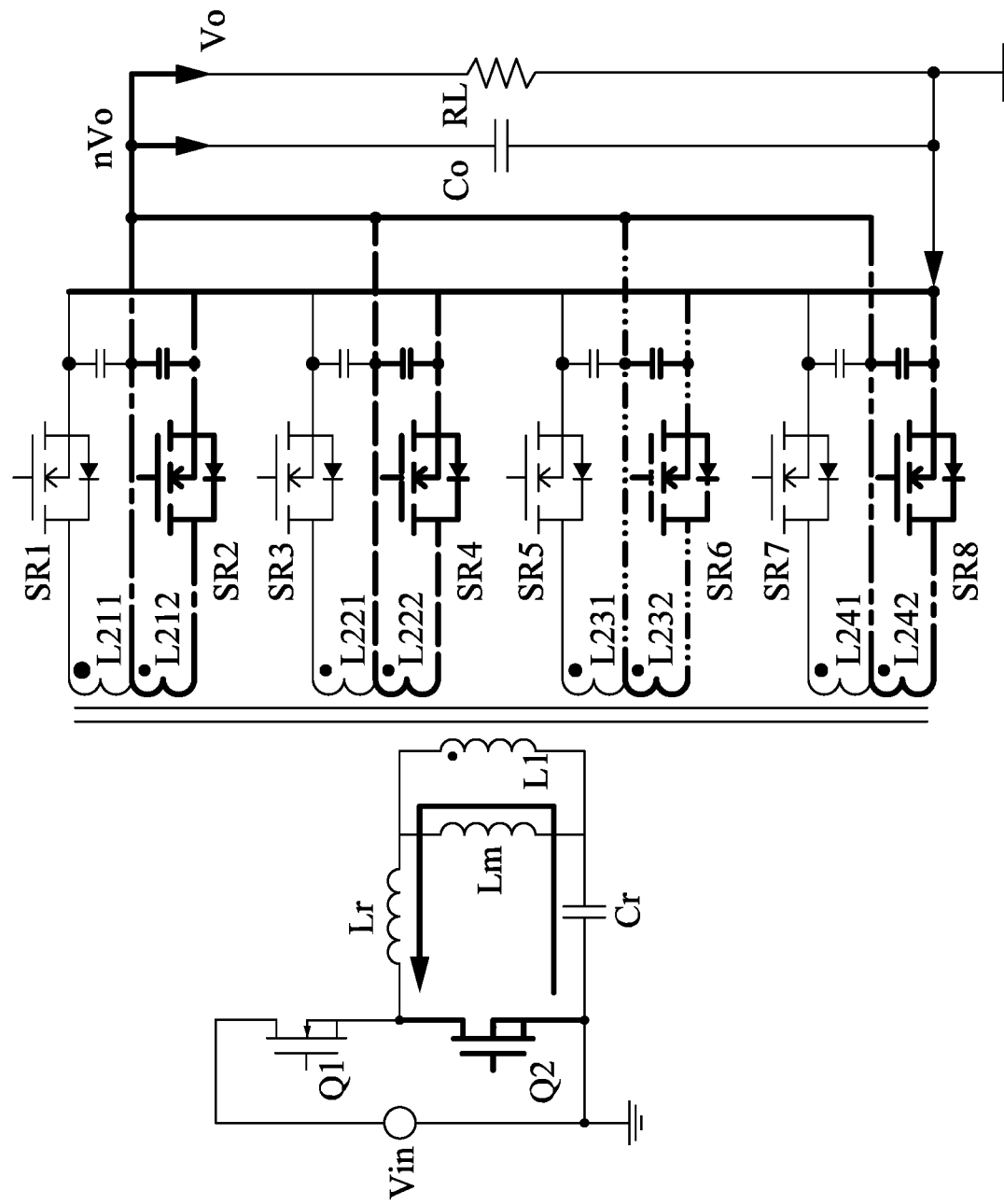
FIG. 4A is a schematic diagram of negative half cycle current paths of the series resonant converter according to an embodiment of the present disclosure.
Figure 4B:
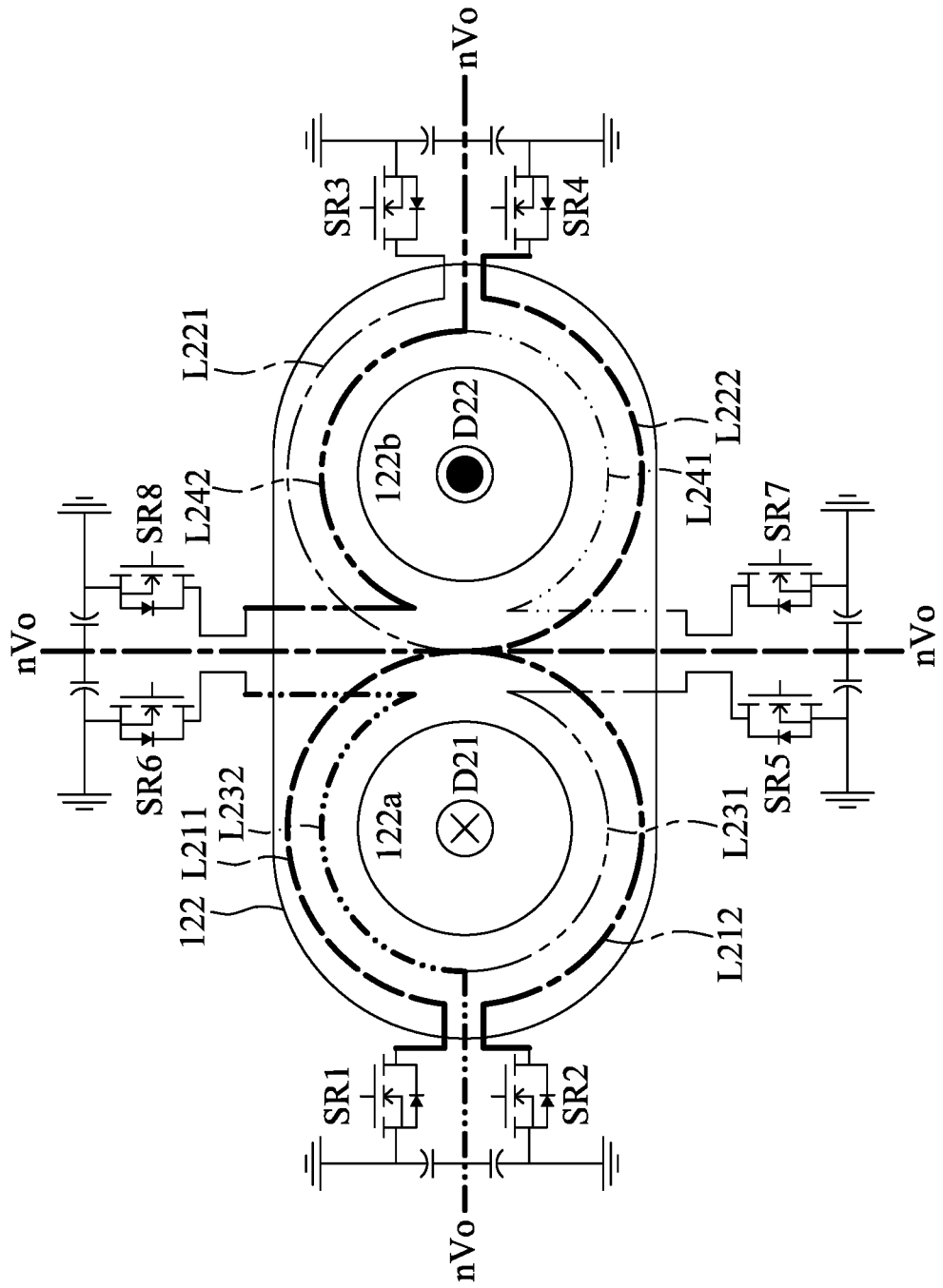
FIG. 4B is a schematic diagram of current paths of a positive half cycle winding of the primary side winding of the series resonant converter according to an embodiment of the present disclosure.

Reference is now made to FIGS. 4A and 4B, FIG. 4A is a schematic diagram of negative half cycle current paths of the series resonant converter according to an embodiment of the present disclosure, and FIG. 4B is a schematic diagram of current paths of a positive half cycle winding of the primary side winding of the series resonant converter according to an embodiment of the present disclosure.

In the negative half cycle operation mode, the primary side upper bridge switch Q1 is turned off, and the primary side lower bridge switch Q2 is turned on. As shown in FIG. 4A, a current direction of the primary side flows clockwise at the first outer column 122a, and flows counterclockwise at the second outer column 122b causing an induced magnetic field in the magnetic core 122. Magnetic field directions D11 and D21 on the first outer column 122a and the second outer column 122b are as shown in FIG. 4A.

According to Faraday's law, the secondary side of the transformer 120 generates a current in the clockwise direction in the first outer column 122a and a current in the counterclockwise direction in the second outer column 122b to against the applied magnetic field, and a current on the secondary side of the transformer 120 flows from the ground to the rectifier switches SR2, SR4, SR6, SR8, flows through the secondary windings L221, L241, L222, and L242, and finally flows to the output node nVo.

Here, any of nodes Vout is connected to the same node with the remaining three nodes Vout, and any one point of the ground levels is connected to the same node with the remaining three points of the ground level, as shown in FIG. 4B. Therefore, the secondary side windings L211, L221, L231, L241, L212, L222, L232, and L242 can also be regarded as being connected in parallel relationship and the number of equivalent turns on the secondary side is still 0.25 turns. As can be seen from the FIGS. 4A and 4B, when any switch is turned on and the current flows in the transformer 120, the secondary side windings L21, L22, L23, and L24 of the transformer 120 can be equivalent to a complete turn in the current flow direction, and thus the method is equivalent to the existing transformer winding method while considering the magnetic flux, and there is no flux imbalance issue inherent in other fractional windings. Since each winding is in parallel relationship, it can achieve 0.5 of fractional turns for the secondary windings L211, L221, L231, L241, L212, L222, L232, and L242 of the transformer 120. Compared with the conventional winding method, the copper loss on the secondary side windings of the transformer 120 under the condition of large current output can be reduced.

Further, when operating in the positive half cycle operation mode, the number of equivalent winding turns summed by the four secondary side windings L211, L221, L231 and L241 as the positive half cycle windings is 1, and when operating in the negative half cycle, the number of equivalent winding turns summed by the four secondary side windings L212, L222, L232 and L242 as the negative half cycle windings is 1. In this case, numbers of winding turns of secondary side windings L211, L221, L231 and L241 as the positive half cycle windings and the secondary side windings L212, L222, L232 and L242 as the negative half cycle windings may each be 0.25.

In the present embodiment, the resonant tank 110 consists of the resonant inductor Lr, the resonant capacitor Cr, and the magnetizing inductance Lm. By the interleaved switching of the primary side upper bridge switch Q1 and the primary side lower bridge switch Q2, energy is transmitted from the resonant tank 110 and the transformer 120 to the secondary side output, and a dead-time in that the primary side upper bridge switch Q1 and the primary side lower bridge switch Q2 stop switching is utilized to release the energy stored on the parasitic capacitance of the primary side upper bridge switch Q1 and the primary side lower bridge switch Q2 to zero, and a characteristic that the series resonant converter can be zero-voltage switched to ON state is achieved.

Figure 5:
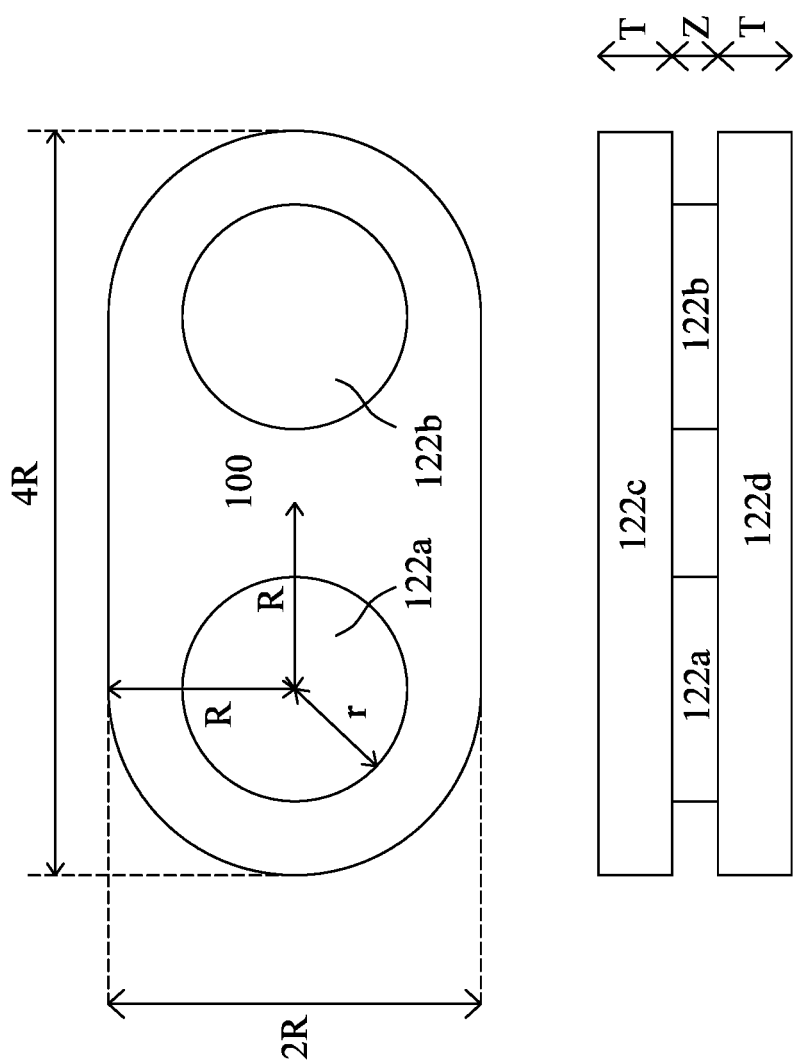
FIG. 5 is a schematic top plan view and a side view of a transformer according to an embodiment of the present disclosure.

Reference is made to FIG. 5, which is a schematic top plan view and a side view of a transformer according to an embodiment of the present disclosure. FIG. 5 shows radius r of an effective sectional area of the magnetic core 122, a maximum length R of the winding radius, thicknesses T of the upper cover 122c and the lower cover 122d, and column heights Z of the first outer column 122a and the second outer column 122b.

Firstly, loss characteristics of the high-frequency magnetic material should be considered, and a peak magnetic flux density should not exceed 100 mT. If the magnetic flux exceeds 100 mT, the loss of the magnetic core 122 can be greatly increased according to a manual of the magnetic material. Therefore, 600 kW/m3 of unit volume loss can be selected for the following design in the present disclosure. In the present embodiment, the high-frequency magnetic material 3F46 manufactured by Ferroxcube Co., Ltd. is used as the material of the magnetic core 122, and when the unit volume loss is 600 kW/m3, the peak magnetic flux density can be obtained as 63 mT, and therefore the effective cross-sectional area Ae of the magnetic core 122 can be obtained by the following equation (3), where Vin is the input voltage 380V of the circuit, Bmax is the peak magnetic flux density having magnitude of 63 mT, and Np is the number of turns of the primary side winding L1, which is 8 turns, f is an operating frequency 1 MHz for the circuit.

$$r^2 = A_e = \frac{Vin}{8 \cdot Bmax \cdot np \cdot f}. \tag{3}$$

From the equation (3), the area Ae is obtained as 100 mm$^2$, and the radius r of the cross-sectional area of the magnetic core 122 is 5.642 mm. Next, a parameter Q of the magnetic core 122 is used; as shown in the following equation (4), the larger the parameter Q is, the larger the winding radius R of the magnetic core 122 is. A value obtained by subtracting the wire winding radius R of the magnetic core 122 from the radius r of the effective sectional area of the magnetic core 122 is the winding width of the magnetic core 122. The larger the width is, the smaller the DC resistance of the trace of the transformer 122 is, and the smaller the loss of the copper wire is.

$$R(Q)=Q \cdot r \tag{4}.$$

The thickness of the magnetic core 122 is shown in FIG. 5. Since the magnetic flux density needs to be consistent in each path, the effective sectional area of the magnetic core 122 should be equal to the cross-sectional area through which the magnetic flux in the upper cover 122c and the lower cover 122d flows through, which can be represented by the following equation (5).

$$T(Q) = \frac{\pi r}{2Q}. \tag{5}$$

The total volume of the magnetic core 122 can be obtained according to the above equation, as shown in the following equation (6).

$$Vel(Q)=2Ae \cdot z+2[4R(Q)^2 \cdot T+\pi \cdot R(Q)^2 \cdot T] \tag{6}.$$

Next, by using the Steinmetz equation, the loss of the core 122 can be expressed by a form of parameters, as shown in the following equation (7). Where Pv is the unit volume loss of the magnetic core 122, the magnitude of which is exponentially proportional to the operating frequency and the magnitude of the peak magnetic flux, as shown in the following equation (8). Where Cm, x, and y can be obtained from a magnetic core material manual of the manufacturer. In a case of constant frequency, only the peak magnetic flux density needs to be considered.

$$Coreloss(Q)=Pv(B \max(Q) \cdot Vel(Q)) \tag{7};$$

$$Pv=Cm \cdot f^x \cdot B \max^y \tag{8}.$$

It can be seen from the above descriptions that the magnetic core 122 can be optimized by the relevant parameter equations of the core loss to obtain the minimum value of the loss at the selected Q value.

In particular, the advantage of the present disclosure is that an actual trace on the secondary side of the transformer is a half turn, so that the copper loss can be effectively reduced. Further, the loss of the magnetic core is expressed by the following equations (9), (10), and (11), and it is understood that the core loss has a positive correlation with the peak magnetic flux density Bmax.

$$Coreloss = Pv \cdot Vel; \quad (9)$$

$$Pcv = Cm \cdot f^x \cdot Bmax^y; \quad (10)$$

$$Bmax = \frac{Vin}{8 \cdot Ae \cdot np \cdot f}. \quad (11)$$

Assuming that a voltage specification of 380V to 12V is utilized, the transformer turns ratio thereof is 16:1. When using an existing transformer, for example, the secondary winding is 0.5 turns each. In order to maintain the same transformer turns ratio, the primary winding is set to 8 turns, forming a ratio of 8:0.5. Therefore, for the primary side of the transformer, the line loss can be reduced by half, but in order to maintain the same Bmax, the effective Ae value of the core will be increased to be twice that of the original value. For the core loss and volume, the more the secondary side fraction is divided, the larger the core loss and the magnetic core volume will become.

However, in the two-column structure provided by the fractional-turns provided by the present disclosure, although the secondary side has half-turn windings, the actual transformer turns ratio is still 1, and therefore the core volume and the core size have more advantages when compared with the existing transformer design.

In conclusion, the transformer and the series resonant converter including the same provided by the present disclosure can effectively combine concepts of flux canceling and fractional-turn transformer, while reducing core loss and copper loss, thereby achieving high efficiency and high power density.

Furthermore, when any switch is turned on and current flows in the transformer, the secondary side windings of the transformer 120 can be equivalent to a complete turn in the current flow direction, and thus the method is equivalent to the existing transformer winding method when considering the magnetic flux, and there is no flux imbalance problem inherent in other fractional windings. Since each winding is in parallel relationship, it can achieve 0.5 of fractional turns for the secondary windings of the transformer. Compared with the conventional winding method, the copper loss on the secondary side windings of the transformer under the condition of large current output can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A series resonant converter, comprising:
    a switching circuit having a power supply connected to a primary side upper bridge switch and a primary side lower bridge switch, wherein the primary side upper bridge switch and the primary side lower bridge switch are configured to control an input of the power source;
    a resonant tank coupled to the switching circuit, including a resonant inductor, a resonant capacitor and a magnetizing inductor connected in series;
    a transformer coupled to the resonant tank, including:
        a magnetic core, including:
            a first outer column and a second outer column; and
            an upper cover and a lower cover, wherein the first outer column and the second outer column are disposed between the upper cover and the lower cover;
        a primary side winding wound around the first outer column and the second outer column; and
        a plurality of secondary side windings wound around the first outer column and the second outer column; and
    a rectifier circuit having a plurality of secondary side output rectifier switches connected to the transformer for receiving and rectifying an output of the transformer, and coupling an output capacitor and a load,
    wherein the secondary side windings are connected to the secondary side output rectifier switches through a region between the first outer column and the second outer column,
    wherein each of the plurality of secondary windings includes a positive half cycle winding and a negative half cycle winding, in which a number of winding turns of the secondary winding as the positive half cycle winding and a number of winding turns of the secondary winding as the negative half cycle winding are both 0.5, and the plurality of secondary windings pass through the region between the first outer column and the second outer column to pass through a region in which a magnetic flux is formed with a closed loop in the transformer.

2. The series resonant converter according to claim 1, wherein a number of winding turns of each of the secondary side windings on the first outer column is 0.5, and a number of winding turns of each of the secondary side windings on the second outer column is 0.5.

3. The series resonant converter according to claim 2, wherein a number of the secondary side windings on the first outer column is 4, and a number of the secondary side windings on the second outer column is 4.

4. The series resonant converter according to claim 1, wherein the primary side winding has an equivalent number of winding turns of 4 on the first outer column and an equivalent number of winding turns of 4 on the second outer column.

5. The series resonant converter according to claim 1, wherein each of the secondary windings is a central tap structure, and each of the plurality of secondary side output rectifier switches includes a positive half cycle rectifier switch and a negative cycle rectifier switch, and wherein each of the positive half cycle windings is coupled to each of the positive half cycle rectifier switches, respectively, and each of the negative half cycle windings is coupled to each of the negative half cycle rectifier switches, respectively.

6. The series resonant converter according to claim 5, wherein in a positive half cycle operation mode, the primary side upper bridge switch is turned on, the primary side lower bridge switch is turned off, each of the positive half cycle rectifier switches is turned on, and each of the negative half cycle rectifier switches is turned off;

wherein in a negative half cycle operation mode, the primary side upper bridge switch is turned off, the primary side lower bridge switch is turned on, each of the positive half cycle rectifier switches is turned off, and each of the negative half cycle rectifier switches is turned on; and wherein in the positive half cycle operation mode, current paths generated on the primary side winding and the at least four secondary side windings are different from those in the negative half cycle operation mode.

7. The series resonant converter according to claim 6, wherein in the positive half cycle operation mode, an equivalent number of winding turns generated by the secondary side windings on the first outer column is 1, and an equivalent number of winding turns generated by the secondary side windings on the second outer column is 1.

8. The series resonant converter according to claim 6, wherein in the negative half cycle operation mode, an equivalent number of winding turns generated by the secondary side windings on the first outer column is 1, and an equivalent number of winding turns generated by the secondary side windings on the second outer column is 1.

9. The series resonant converter according to claim 1, wherein the primary side upper bridge switch and the primary side lower bridge switch are enhanced gallium nitride field-effect transistors.

10. A transformer, comprising:
a magnetic core, including:
a first outer column and a second outer column; and
an upper cover and a lower cover, wherein the first outer column and the second outer column are disposed between the upper cover and the lower cover;
a primary side winding wound around the first outer column and the second outer column; and
a plurality of secondary side windings respectively wound around the first outer column and the second outer column;
wherein each of the secondary windings has one end passing through a region between the first outer column and the second outer column,
wherein each of the plurality of secondary windings includes a positive half cycle winding and a negative half cycle winding, in which a number of winding turns of the secondary winding as the positive half cycle winding and a number of winding turns of the secondary winding as the negative half cycle winding are both 0.5, and the plurality of secondary windings pass through the region between the first outer column and the second outer column to pass through a region in which a magnetic flux is formed with a closed loop in the transformer.

11. The transformer according to claim 10, wherein a number of winding turns of each of the secondary side windings on the first outer column is 0.5, and a number of winding turns of each of the secondary side windings on the second outer column is 0.5.

12. The transformer according to claim 11, wherein a number of the secondary side windings on the first outer column is 4, and a number on the second outer column is 4.

13. The transformer according to claim 11, wherein the primary side winding has an equivalent number of winding turns of 4 on the first outer column and an equivalent number of winding turns of 4 on the second outer column.

* * * * *